United States Patent [19]

Landgraf et al.

[11] 3,900,952
[45] Aug. 26, 1975

[54] ELECTRICAL MOTOR, PARTICULARLY FOR DRIVING DENTAL HANDPIECES AND ANGULAR PIECES

[75] Inventors: Hermann Landgraf, Wilmshausen; Eugen Hohmann, Happenheim, both of Germany

[73] Assignee: Siemens Aktiengesellschaft, Munich, Germany

[22] Filed: Nov. 19, 1973

[21] Appl. No.: 417,414

[30] Foreign Application Priority Data
Nov. 22, 1972 Germany............................ 2257301

[52] U.S. Cl. ................... 32/27; 310/154; 308/9
[51] Int. Cl.[2].. A61C 1/10; H02K 23/04; F16C 7/04
[58] Field of Search............. 308/9, 10, 122; 32/26, 32/27; 417/423; 415/503; 310/90, 40 MM, 154, 42, 40, 259, 258, 89

[56] References Cited
UNITED STATES PATENTS

| | | | |
|---|---|---|---|
| 2,905,149 | 9/1959 | Swanson | 415/503 |
| 3,124,962 | 3/1964 | Hirtreiter | 308/10 |
| 3,243,238 | 3/1966 | Lyman | 308/10 |
| 3,439,422 | 4/1969 | Doeden | 32/27 |
| 3,472,323 | 10/1969 | Hall | 415/503 |
| 3,578,872 | 5/1971 | McBurnie | 32/26 |
| 3,582,228 | 6/1971 | Tomita | 415/503 |
| 3,584,629 | 6/1971 | Hoef | 415/503 |
| 3,586,397 | 6/1971 | Dee | 308/9 |
| 3,677,351 | 7/1972 | Geissler | 415/503 |
| 3,758,228 | 9/1973 | Post | 415/503 |

Primary Examiner—R. Skudy
Attorney, Agent, or Firm—V. Alexander Scher

[57] ABSTRACT

An electric motor for driving dental handpieces, comprising a rotary part consisting of a rotary body and rotary shaft. The said rotary part is carried by an air cushion formed by the introduction of compressed air into an air space between the rotary part and a fixed part of the said motor.

5 Claims, 6 Drawing Figures

ELECTRICAL MOTOR, PARTICULARLY FOR DRIVING DENTAL HANDPIECES AND ANGULAR PIECES

This invention relates to an electric motor, particularly for driving dental handpieces and angular pieces, which has a rotary part consisting of a rotary body and a rotary shaft. The rotary part is carried by an air cushion formed by introducing compressed air into an air space between the rotary part and a fixed part of the motor.

Such a motor has bushings mounted at both ends of the rotor shaft and forming with their outer surfaces halves of a compressed air bearing the other halves of which are bearing cups fixed to the immovable part of the motor into which open supply conduits for the compressed air toward the compressed air bearings.

These compressed air bearings must be comparatively wide and have a correspondingly large diameter so as to have a sufficenty large bearing force. The result is that the total length of such a motor must be comparatively large and this often makes questionable the desired use of the motor or creates difficulties in small spaces. These motor constructions due to their long length are badly suited particularly for a direct drive of dental handpieces and angular pieces which are held in the hand like a pencil (the motor lies in the bend between the thumb and the forefinger of the hand holding the handpiece), although they could have found use due to the low running noises. However, the large size of the motor makes difficult the operation of the handpiece motor and thus makes fine operation impossible.

It is possible, however, to shorten the length of the motor while maintaining the bearing carrying force in case of a rotor body supported by ball bearings. However, ball bearings have the drawback of producing comparatively high running noises. Furthermore they require a fat or oil lubrication. Due to the high running speeds there is the danger that the lubricant will move out of the bearings and will reach the contacting parts, for example the commutator brushes, which would result in a dropout of the motor.

These known electric motors have, in addition, the drawback that the stator casing must be made of several parts to make possible the build in of the rotor with bearing bushings located on both sides. Furthermore, due to the comparatively large distance between the two compressed air bearings at both ends of the shaft, it is necessary to have a very high precision while fitting the bearings, in order not to worsen the properties of the bearings and to avoid to a great extent errors which would cause a too early ear out of the bearings and thus a stop of the motor.

An object of the present invention is the provision of an electric motor of the above described type, supplied with compressed air, which will not have the drawbacks of known motors. The motor should be of simple structure as far as its assembly is concerned due to servicing which may be required later on. Of particular importance is to reduce the structural length of the motor, as compared to prior art motors, without it being necessary to substantially increase the diameter of the motor.

The solving of this problem cannot be carried out by increasing the pressure of supporting air since this would increase the height of the motor by requiring larger cross-sections of the supplying channels.

In the accomplishment of the objectives of the present invention for an electric motor supplied with compressed air of the above-described type it was found desirable to use the air space between the rotary body and the fixed part as the bearing of the rotary part. It is of advantage to arrange the bearing so that the bearing space lies substantially in the magnetic air space between the rotary body and the fixed part. In case of the motor structure which is mostly used, namely, a motor having a cylindrical inner runner as the rotary part and a fixed stator, one of the shaft stumps of the rotor shaft can be eliminated so long as it is not required for driving purposes. This not only provides a shorter structural length but also requires smaller starting and ending moments due to the smaller swinging mass of the rotary part.

It is of advantage when the length of the bearing space substantially corresponds to the length of the magnetic air space. This makes possible to provide on the one habd a sufficiently strong supporting force even for a larger load and on the other hand produces technical simplifications concerning the bearing. According to an advantageous embidiment of the present invention the supply of compressed air to the compressed air bearing space takes place by means forming a section of the fixed part and participating in the field formation at the bearing space. According to a further embodiment of the present invention for that purpose can be used a motor with a permanent magnetic stator as the fixed part, the stator being formed of several ring-shaped discs with intermediate rings between these discs which contain channels supplying compressed air to the bearing. The intermediate rings which for manufacturing purposes consist of a soft material, have radially directed nozzles through which the carrying air is transmitted to the bearing space.

Good own running conditions for the starting and stopping of the motor can be attained if the outer surface of the rotor is provided with a coating of a well sliding material. It is expedient to enclose the entire rotary body with a sliding layer, preferably a plastic provided with a sliding substance. Such a coating does not have a detrimental effect upon magnetic properties of the motor; magnetic short circuits or stray current formations cannot take place.

According to a further advantageous embodiment of the present invention, it is suggested that at least one of the front sides of the cylindrical rotary body should form a half of a further compressed air bearing supporting axially the rotary part. The other half is a corresponding ring containing channels supplying compressed air to the further compressed air bearing. The ring can be constructed to provide adjustment of the axial bearing width of the further bearing.

The supply of compressed air to the compressed air bearing, preferably takes place between the inner wall of the casing and the outer wall of the fixed part, a slit being formed between these parts. This has the advantage that the compressed air supplied as the supporting air cools at the same time the winding of the motor and other parts heated in operation, and also protects the outer cover of the casing from excessive heating.

The invention will appear more clearly from the following detailed description when taken in connection with the accompanying drawing showing, by way of example only, a preferred embodiment of the inventive idea.

Figure 1:
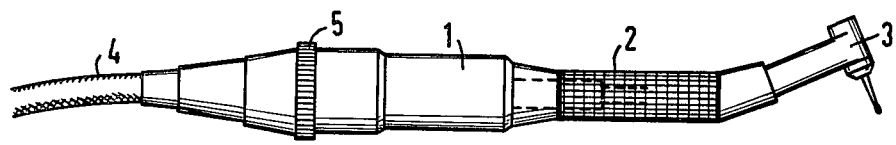
FIG. 1 is a side view of a dental handpiece driven by a small electric motor.

FIG. 1 is a side view of a dental boring handpiece 2 driven by a motor 1, and having at its free end a boring head 3 for receiving a boring tool. At the rear end of the motor 1, a supply hose 4, used for supplying compressed air and electrical current, is connected by a suitable screw connection 5. The handpiece 2 is rotatably supported about the longitudinal axis of the motor.

Figure 2:
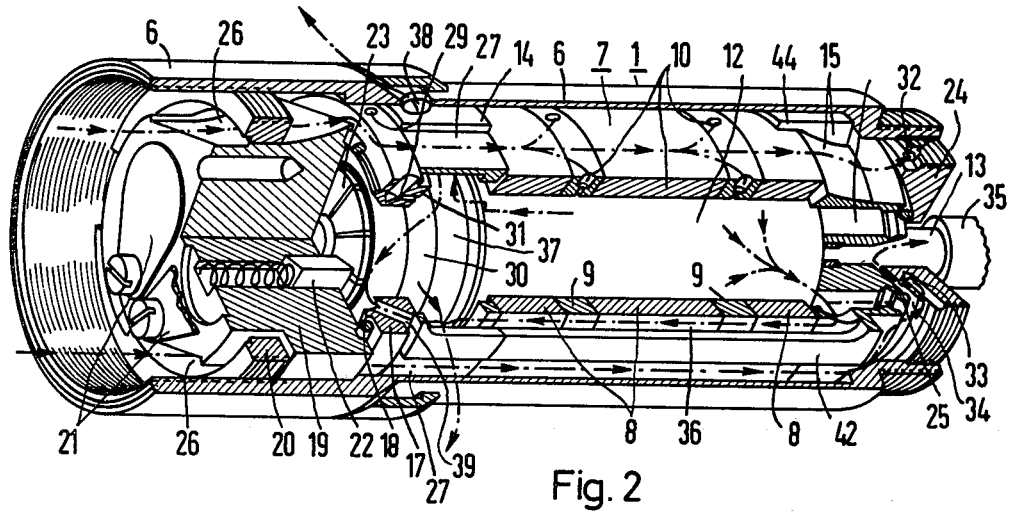
FIG. 2 is perspective section through the motor driving the handpiece.

FIG. 2 shows the motor 1 in section. A stator 7 is located in the cylindrical casing 6, and consists substantially of three annular discs 8 of magnetic material, as well as of two intermediate rings 9. The intermediate rings 9 contain supply channels and nozzles 10 for a compressed air bearing, which is limited, on the one hand, by the outer surface 11 of a cylindrical rotor body 12, which along with the driving shaft 13, forms the rotary part of the motor, and, on the other hand, by the surfaces of fixed station parts 8, 9, which are directed to the surface 11. The air gap of the compressed air bearing 8, 9, 11, thus coincides with the magnetic air space between the stator 7 and the rotor body 12. This greatly reduces the constructional length of the motor.

However, it is not absolutely necessary that the air space of the compressed air bearing should lie solely in the magnetic air space between the stator and the rotor body. It is also possible to extend the rotor body on one side or both sides beyond its front sides and then use the part 7 of the stator which is also extended beyond the front surfaces, for the formation of air bearing. It is also possible to make the stator of one piece. However, the arrangement shown in the drawing has the advantage that the two discs 9 can be made of a soft material which is easy to work on. The discs 8, which should not be bored, consist of magnetic material which is very difficult to work on. The compressed air bearing acts as a radial bearing, and extends through the entire length of the rotor body part, limited by the outer surface 11. This provides a sufficiently great supporting surface, which is located in a space saving manner, in the already available air gap between the stator 7 and the rotor body 12. The height of the bearing gap can correspond to the height of the magnetic air gap, but it can also be smaller. This is, for example, the case when, according to an advantageous embodiment of the present invention, the rotor body 12 is provided with a layer of well sliding material which provides good self-running properties for the starting and stopping of the motor. As coating material can be used, for example, cast resin to which graphite is mixed. If the stator 7 has windings, then the supply channels and nozzles 10 can be arranged to pass through these windings.

On the front side of the stator 7, there are two air conducting parts 14, 15. These parts, as well as the stator 7, are firmly glued in the casing 6. An air conducting ring 17 is supported at the part 14. An insulating part 19 lies upon the ring 17 with the intermediate location of a rubber ring 18. The part 19 is fixed by a screw ring 20. The insulating part 19 contains contacts 21, which are connected with current supplying brushes 22, through conduits not shown in the drawing. The brushes 22 lie upon contact surfaces of a front collector 23, arranged at the rotor body 12. A screw ring 24, which presses a rubber ring 25 against the front surface of the part 15, forms the closure at the end directed to the side of the handpiece.

Compressed air, supplied through the hose 4 (FIG. 1), is conducted in directions shown by arrows in the drawing, through channels 26, 27 provided in the insulating part 19, and the ring 14, into the space formed between the casing 6 and the outer surface of the stator 7, and from there through outflow openings 10 to the air bearing. A part of the supplied compressed air penetrates already through the inlet side through openings 29, located radially in the ring 17, into an axial bearing, which is limited by the front side of the ring surface 30 of the rotor body 12, and the front surface 31 of the ring 17, located opposite thereto.

From the side of the handpiece a part of supplied compressed air flows through radially directed openings 32 provided in the threaded ring 24 into a further axial bearing formed by the other front surface 33 of the rotor body 12 and the front surface 34 of the threaded ring 24 located opposite thereto. Compressed air flowing out of this axial bearing 33, 34 passes through an air space provided between the shaft 13 and the ring 24 in the direction indicated by an arrow in the drawing toward the handpiece 2. Numeral 35 in the drawing indicates the counter piece of the handpiece 2 which can be placed upon the shaft 13 of the motor. Compressed air flowing out of the axial bearings 33, 34 also reaches in part the channel 36 at the hose-side end of the motor, which is limited by the stator 7 and the part 15. A larger part of compressed air leaving the radial bearing also flows into the channel 36. As shown by the direction of arrows in the drawing a part of the radial bearing air also flows into an annular channel limited by the ring 14 and the outer surface 37 of the rotary body 12, and from there it can leave into the open through openings 38. The ring 17 also includes worked in transverse channels 39 which remove air from the space around the front collector 23. This collector space is connected with a ring channel limited by the parts 14 and 27. The special arrangement of the outflow channels provides an air flow in the collector space which removes brush dust dropping in the collector through the outflow openings 39 and 38.

The rubber ring 25 located between the part 15 and the screw ring 24 is used on the one hand to separate compressed air supplied to the axial bearing from air flowing away from the bearing and on the other hand to prevent the threaded ring from turning during the operation. The threaded ring 14 can change the bearing slit of the axial bearing 33, 34 by a greater or smaller further turning and thus adjust the bearing space.

Figures 3, 6:
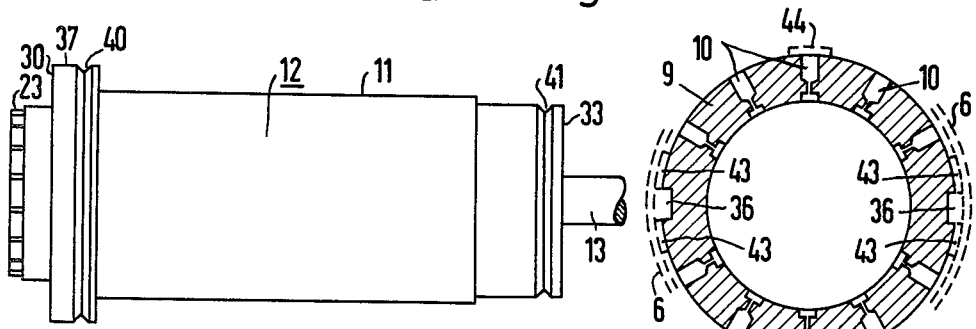
FIG. 3 is a side view of the rotor body.
FIG. 6 is a section through an internal brake ring.

FIGS. 3 to 6 show parts of the motor. FIG. 3 shows the rotor as a separate part. The recesses 40 and 41 in the body of the rotor serve for centering and balancing it. Since the rotary part of the motor has a single shaft stump 13 the rotor can be easily built in and removed. It is not necessary to have a precise alinement and adjustment of the bearings on both sides, which is required in prior art motors. Particularly in smaller and smallest motors the axial compressed air bearing on the hose side can be eliminated, since under certain conditions the front collector 23 and the coal brushes which engage it can receive the required bearing supporting force.

Figure 4:
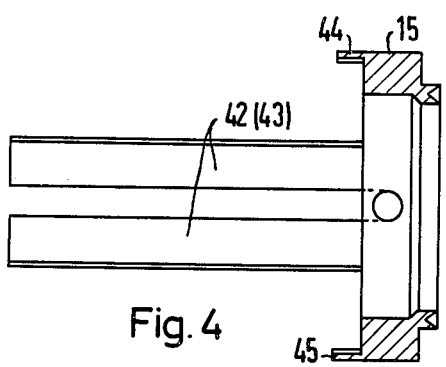
FIG. 4 shows an air conducting part, partially in section.
Figure 5:
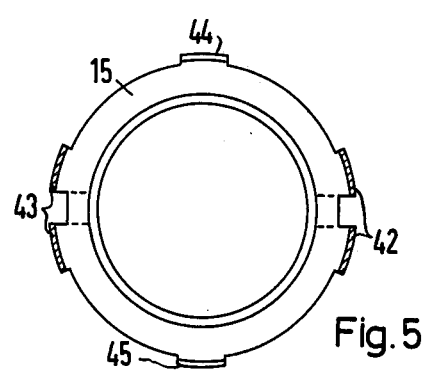
FIG. 5 is a side view of the part shown in FIG. 4.

FIG. 4 shows the part 15 from the side in section while FIG. 5 shows it in top view partly in section. Two flap parts 42 and 43 extend on both sides along the motor; they form along with the casing 6 and the stator 7 the air conducting channels 36. Two projections 44 and 45 determine the space of the stator 7 from the casing.

FIG. 6 shows an intermediate ring 9 in cross-section. By broken lines are indicated the two flap pairs 42, 43 as well as two projections 44 and 45. The outlines of the casing 6 are shown by broken lines, so that in conjunction with FIG. 2 the flow of incoming and outgoing air to and away from the pressure air bearings is more clearly indicated.

What is claimed is:

1. An electric motor for driving dental hand-pieces, comprising a permanent magnet stator arranged in a substantially cylindrical housing, and a rotor body carrying a rotor shaft and mounted in a compressed air bearing, wherein said permanent magnet stator is formed by several annular discs of permanent magnetic non ductile material and intermediate rings of material softer than that of said discs and arranged therebetween, said intermediate rings having conduits for supplying compressed air to said compressed air bearing arranged in radial direction, and wherein the air gap of said air bearing lies predominantly in the magnetic air gap between said rotor body and said stator, the compressed air for the formation of said bearing being conducted into said air gap through said radially arranged conduits.

2. The electric motor of claim 1, wherein the discs and the intermediate rings form, with their generated surfaces in the said housing, a gap extending along the motor housing for supplying compressed air to the compressed air bearing.

3. The electric motor according to claim 1, to whose rear end a feed means is connectable by a connecting means to supply compressed air and electrical energy, and wherein between said housing and stator guide means are arranged to return the air flowing out of the compressed air bearing between said housing and stator, and separately from the supplied compressed air, to the end of the motor directed towards said connecting means.

4. The electric motor according to claim 1, wherein at least one of the end faces of the said rotor body forms one half of an additional compressed air bearing axially supporting the said rotor, and whose other half is a ring fitting it, fixed in the said stator housing, and containing compressed air feed conduits for the additional compressed air bearing.

5. The electric motor of claim 4, wherein the said ring has means for adjustment of the bearing gap of the said additional bearing.

* * * * *